United States Patent Office 3,557,552
Patented Jan. 26, 1971

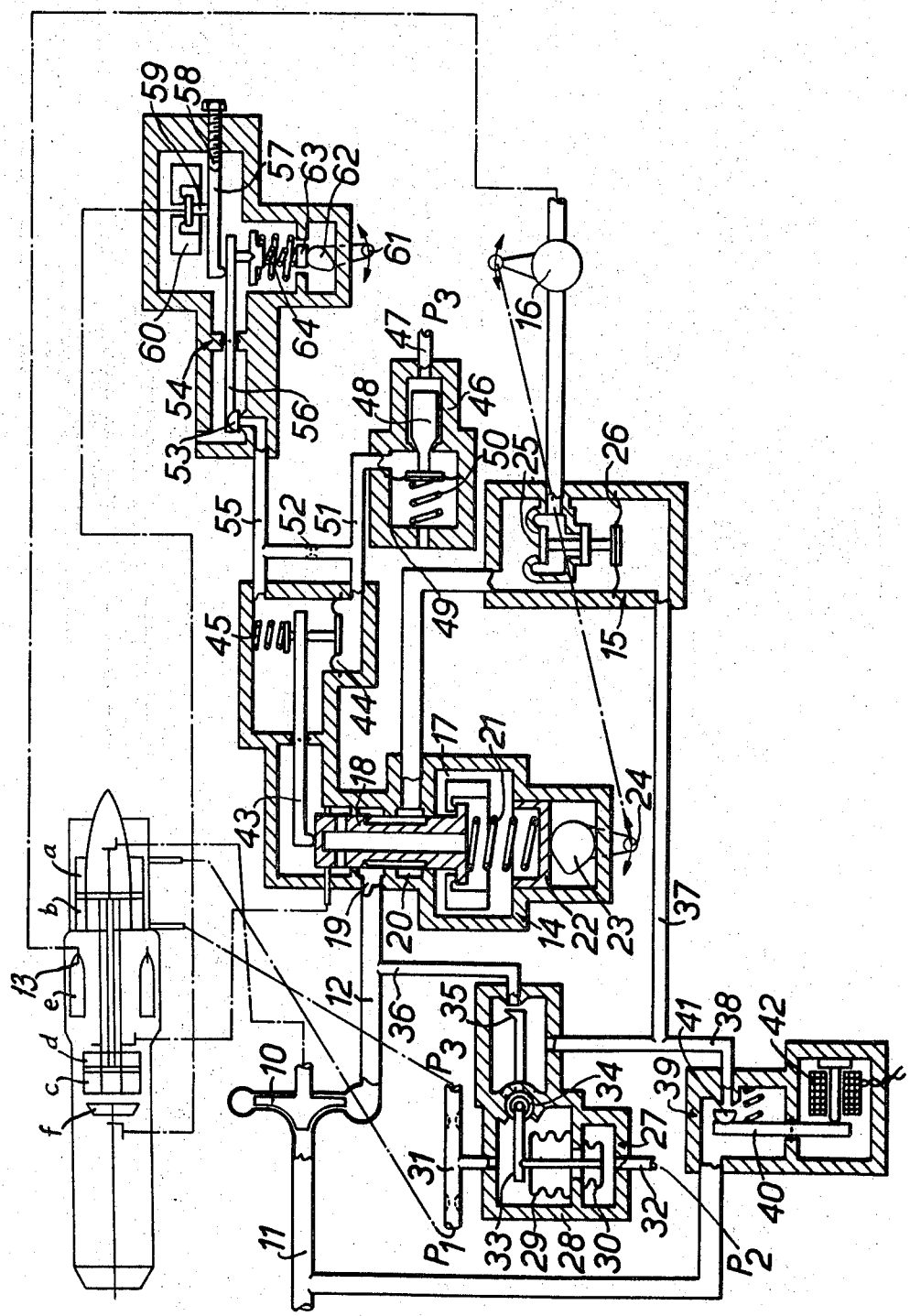

3,557,552
GAS TURBINE ENGINE INSTALLATION
FUEL SYSTEMS
Thomas Charles Yates, Solihull, England, assignor to
Joseph Lucas (Industries) Limited, Birmingham, England
Filed Oct. 21, 1968, Ser. No. 769,050
Claims priority, application Great Britain, Oct. 19, 1967,
47,575/67
Int. Cl. F02c 9/08, 3/10
U.S. Cl. 60—39.16          4 Claims

ABSTRACT OF THE DISCLOSURE

A gas turbine engine installation comprising apparatus for producing a stream of gas and a work turbine through which the gas stream is passed, the fuel system comprising a fuel pump, a control whereby idling or maximum supply can be selected, acceleration control means controlled in accordance with engine conditions, a speed responsive device controlling the fuel in accordance with said acceleration control means, a further speed responsive device modifying response of the first responsive device in accordance with the speed of the work turbine, and a further control providing limited reduction in speed below the maximum selected, said further control being arranged to vary the response of the further speed responsive device.

---

The invention relates to fuel systems for gas turbine engine installations of the kind comprising apparatus for producing a stream of gas which is passed through a work turbine arranged to drive associated equipment. Such an engine installation will be referred to as being of the kind specified.

Installations of this kind are used on helicopters, the work turbine being connected to the main rotor. In such installations, the pilot is able to select either idling or maximum speeds of the installation, and in addition is able to reduce the speed below the maximum to a limited predetermined extent.

The object of the invention is to provide a fuel system for a gas turbine engine installation of the kind specified.

In accordance with the present invention a fuel system for a gas turbine engine installation of the kind specified comprises a fuel pump, a control whereby idling or maximum fuel supply can be selected, acceleration control means for controlling fuel supply in accordance with at least one parameter related to conditions existing within the gas producing apparatus, a speed responsive device arranged to control fuel supply in accordance with a speed signal obtained from said apparatus, a further speed responsive device arranged to modify the response of the first mentioned speed response device in accordance with the speed of the work turbine, a further control associated with said further speed responsive device whereby a limited reduction in speed below the maximum can be selected, said further control being arranged to vary the response of the further speed responsive device.

The invention will now be described by way of example with reference to the accompanying drawing, the single figure of which illustrates diagrammatically a fuel system in accordance with the invention.

The fuel system shown is intended for use on a helicopter and is used in association with a gas turbine engine installation including a pair of compressors $a$, $b$, and a pair of turbines $c$, $d$ mounted on concentric shafts, each of which carries a compressor and turbine. This apparatus also has combustion chambers $e$ in which a fuel and air mixture is burnt before discharged as a stream of gas through the turbines $c$, $d$ of the apparatus. The installation also includes a work turbine $f$ mounted upon an independent shaft, which in this example is concentric with those of the gas producing apparatus, the further turbine being arranged to drive the main rotor of the helicopter (not shown).

The fuel system comprises a centrifugal type pump 10 having an inlet passage 11 leading from a reservoir (not shown) and an outlet passage 12 leading to burners 13 in the combustion chambers of the gas producing apparatus.

In the outlet passage 12 there are arranged in series a speed responsive device 14, a linking valve 15 and a shut-off cock 16. The speed responsive device 14 has a set of weights 17 arranged to be driven from the gas producing apparatus of the installation to provide a speed signal related to the speed thereof. In this example the weights are driven by one of the shafts in this apparatus. The weights are arranged to control the actual position of a valve member 18 which controls fuel flow through a pair of galleries 19, 20 communicating with the passage 12 at upstream and downstream sides of the speed responsive device 14 respectively. A spring 21 acts against the valve member 18 in opposition to the action of the weights 17 with increasing speed, the opposite end of this spring 21 acting against a movable abutment 22. The position of the abutment 22 and therefore the prestress in the spring 21 is controlled by a cam 23 connected to a pilot operated lever 24. The cam is shaped to provide two alternative positions for the abutment 22 corresponding in use to idling and maximum speeds of the associated installation. The lever 24 is connected to the shut-off cock 16, so that the pilot has three alternative positions corresponding to complete shut down, idling and maximum speed respectively.

The linking valve 15 has a valve member 25 arranged to control the flow of fuel through the passage 12 to the burners 13 in accordance with the pressures acting at opposite sides of a diaphragm 26 which is connected to the valve member 25. The pressure at one side of the diaphragm 26 is that in the passage 12 at the upstream side of the valve member 25 of the linking valve 15, and the pressure at the opposite side of the diaphragm is determined by an acceleration control means 27.

The acceleration control means 27 comprises a body 28 in which are disposed, in separate chambers, a pair of intercommunicating evacuated capsules 29, 30. The capsule 29 is subjected to an air pressure which is a function of that existing at the downstream side of the compressor stage of the gas producing apparatus. This pressure is exerted through an air potentiometer device indicated at 31. The capsule 30 is subjected through a passage 32, to the pressure at the downstream side of the first compressor stage of the installation or that at the inlet thereof or other suitable reference pressure.

The effective length of the capules 29, 30 is used to control the position of a lever 33 extending through a torsion hinge 34 into a second chamber in the body 28. The free end of the lever 33 carries a knife 35 which controls the flow of fuel through a passage 36 into the interior of this chamber of the body 28. The passage 36 communicates with the outlet passage 12 from the pump 10 at a position immediately downstream thereof, and the body 28 also has a further passage 37, whereby the fuel pressure in the further chamber of the body 28 is exerted upon the diaphragm 26 of the linking valve 16.

A passage 38 communicating with the passage 37 provides a return path for fuel escaping from the outlet passage 12 of the pump 10 to the inlet passage 11, thereof, through a valve 39.

This valve 39 comprises a spring-loaded lever 40 carrying a valve closure member 41 which limits flow through the passage 38, the lever 40 being positioned in accordance with an electrical signal received in a solenoid coil 42.

The electrical signal is determined, in use, in accordance with the speed of that shaft of the gas producing apparatus which does not drive the weights 17 of the speed responsive device 14, and is also modified in accordance with the temperature existing in the exhaust of the apparatus.

The axial position of the valve member 18 is also controlled by the position of a lever 43 which in turn is positioned by the pressures existing at the opposite sides of the diaphragm 44, and by a spring 45.

The pressures at opposite sides of the diaphragm 44 are obtained through a valve 46 to which the pressure at the downstream side of the compressor stage of the gas producing apparatus is applied through a passage 47. The valve 46 includes a valve member 48, the position of which is controlled by a diaphragm 49 and a spring 50. An outlet passage 51 from the valve 46 communicates with the interior thereof at the side of the diaphragm remote from the spring 50, and the pressure in this passage is determined by the restriction offered by the closure member 48 of the valve 46.

The pressure in the passage 51 is applied at opposite sides of the diaphragm 44, though it is applied to the side at which the spring 45 acts upon the lever 43 through a restrictor 52.

The pressure at the downstream side of this restrictor 52, and therefore upon the diaphragm 44, is modified by the position of a valve closure member 53 of a speed responsive device 54. The valve closure member 53 controls the escape of air through a passage 55, and is carried by a lever 56 which in turn is controlled by the position of a lever 57. The lever 57 is pivotally mounted upon an adjustable fulcrum 58, and is acted upon intermediate the fulcrum 58 and its position of engagement with the lever 56 by a member 59 controlled by weights 60.

The weights 60 are driven from the work turbine of the installation, this arrangement thus modifying the response of the speed responsive device 14 in accordance with changes in speed in the work turbine of the installation.

The speed responsive device 54, however, includes a further control 61 which is a pilot operated, and which controls a cam 62 acting upon an abutment 63 for a spring 64 which acts through the levers 56 and 57 upon the member 59 in opposition to the action of the weights 60. The control 61 is intended to provide for a reduction in the supply of fuel to the burners 13 by varying the speed responsive device 14, so that a limited predetermined reduction in the speed of the apparatus can be achieved.

Having thus described my invention what I claim as new and desire to secured by Letters Patent is:

1. A fuel rystem for a gas turbine engine installation having a gas producing apparatus comprising a compressor stage including at least one compressor, a turbine stage including at least one turbine drivingly connected with the compressor, a combustion apparatus between the compressor stage and the turbine stage, and a work turbine carried on a separate shaft, the gas producing apparatus being arranged to supply gas to the work turbine, the system comprising a centrifugal pump for supplying fuel through a supply passage to the combustion apparatus of the engine, a speed responsive device in said passage in series with the pump, said speed responsive device being driven from the gas producing apparatus of the engine, a manual control acting on said speed responsive device, acceleration control means controlling the pressure in a further passage connected to the supply passage between the pump and said speed responsive device, said acceleration control means being varied in accordance with pressure rise created by the compressor stage of the engine, and a valve in the supply passage which is controlled in accordance with the relative pressures in the supply passage and in said further passage, and a further speed responsive device arranged to modify the effect of said first speed responsive device, said further speed responsive device being driven from the work turbine of the engine.

2. A fuel system as claimed in claim 1 in which the manual control is arranged to select idling or maximum speed of the engine and is arranged to modify the response of said speed responsive device.

3. A fuel system as claimed in claim 1 in which the first speed responsive device includes a piston, the position of which control the flow of fuel through said supply passage, the further speed responsive device controlling a device which controls the pressure of fuel applied to the piston of the speed responsive device.

4. A fuel system as claimed in claim 1 in which a further device including a valve controls the pressure in the further passage by controlling escape of fuel from that passage, said further device being responsive to further operating conditions in the engine.

References Cited
UNITED STATES PATENTS

| | | | |
|---|---|---|---|
| 3,152,444 | 10/1964 | Peczkowski et al. | 60—39.16 |
| 3,309,868 | 3/1967 | Downing et al. | 60—39.16 |
| 3,332,233 | 7/1967 | McQueen | 60—39.28 |
| 3,439,496 | 4/1969 | Bevers | 60—39.16 |

AL LAWRENCE SMITH, Primary Examiner

U.S. Cl. X.R.

60—39.28